(12) United States Patent
Glassman et al.

(10) Patent No.: US 6,523,012 B1
(45) Date of Patent: Feb. 18, 2003

(54) DELEGATION OF PERMISSIONS IN AN ELECTRONIC COMMERCE SYSTEM

(75) Inventors: Steven C. Glassman, Mountain View, CA (US); Mark S. Manasse, San Francisco, CA (US)

(73) Assignee: Compaq Information Technology Group, L.P., Houston, TX (US)

( * ) Notice: Subject to any disclaimer, the term of this patent is extended or adjusted under 35 U.S.C. 154(b) by 0 days.

(21) Appl. No.: 09/316,625

(22) Filed: May 21, 1999

(51) Int. Cl.$^7$ .............................................. G06F 17/60
(52) U.S. Cl. ....................................................... 705/75
(58) Field of Search .............................. 705/75, 35, 67, 705/26, 40, 44; 235/379

(56) References Cited

U.S. PATENT DOCUMENTS

| | | | |
|---|---|---|---|
| 5,339,361 A | 8/1994 | Schwalm et al. | 380/243 |
| 5,802,497 A | 9/1998 | Manasse | 705/27 |
| 5,917,168 A | 6/1999 | Nakamura et al. | 235/379 |
| 5,930,777 A | 7/1999 | Barber | 705/40 |
| 5,987,438 A | 11/1999 | Nakano et al. | 705/41 |
| 6,029,150 A | 2/2000 | Kravitz | 705/39 |
| 6,039,250 A | 3/2000 | Ito et al. | 235/380 |
| 6,105,864 A | 8/2000 | Shiobara et al. | 235/379 |
| 6,157,917 A * | 12/2000 | Barber | 705/26 |
| 6,236,981 B1 * | 5/2001 | Hill | 705/67 |
| 6,293,867 B1 * | 9/2001 | Heidel et al. | 463/25 |

FOREIGN PATENT DOCUMENTS

EP 0 848 343 A2 6/1998
JP 10-171887 6/1998

OTHER PUBLICATIONS

Deckard, Linda; Customer convenience credited for growing popularity of scrip; Amusement business, v105, n34, p3 (3); Dialog copy pp. 1–3.*

* cited by examiner

Primary Examiner—Thomas A. Dixon (57) ABSTRACT

An electronic commerce system includes a broker computer system having a database of scrip representing a form of currency, a vendor computer system having a database containing products which may be exchanged for the scrip, a consumer computer system with which a user may initiate transactions with the scrip, and an agent computer system to which the consumer can delegate rights to perform actions with the scrip. To delegate actions on scrip, the delegator provides the delegatee with a delegation having a list of the delegated actions. In addition, the delegator determines a delegation scrip secret (DSS) and a delegation pass phrase (DPP) and securely passes these to the delegatee. The delegatee uses the DSS to authenticate itself to servers accepting the scrip and uses the DPP to encrypt the DSS while the scrip is stored by the delegatee. To perform an action with delegated scrip, the delegatee sends a request for the action to a server. The request includes the action, the scrip, the delegation, and a request stamp (RS) calculated using the DSS. The server validates the request by recalculating the RS. When server provides the delegatee with new scrip having multiple delegations, the server encrypts the new DSS's for each delegation. The delegates uses the old DSS's to decrypt the DSS's for the new scrip. The delegatee stores the encrypted DSS for delegations for which the delegatee does not know the DSS.

19 Claims, 4 Drawing Sheets

| VENDOR 410 | VALUE 412 | SCRIP ID 414 | CUST. ID 416 | EXPIRES 418 | PROPS 420 | STAMP 422 |

FIG. 7

DELEGATION OF PERMISSIONS IN AN ELECTRONIC COMMERCE SYSTEM

CROSS-REFERENCE TO RELATED APPLICATIONS

This application is related to U.S. Pat. No. 5,802,497, entitled METHOD AND APPARATUS FOR CONDUCTING COMPUTERIZED COMMERCE, which issued on Sep. 1, 1998, and is hereby incorporated by reference herein.

This application is also related to U.S. patent application Ser. No. 09/081,521, entitled METHOD FOR COMMUNICATING SECURE AND AUTHENTICATED TRANSACTIONS OVER AN NON-SECURE NETWORK SUBJECT TO EXPORT RESTRICTIONS, which was filed on May 19, 1998, and is hereby incorporated by reference herein.

This application is also related to U.S. patent application Ser. No. 09/273,240, entitled ENCRYPTING SECRETS IN A FILE FOR AN ELECTRONIC MICRO-COMMERCE SYSTEM, which was filed on Mar. 19, 1999, and is hereby incorporated by reference herein.

This application is also related to U.S. patent application Ser. No. 09/273,102, entitled ANONYMOUS PURCHASES WHILE ALLOWING VERIFIABLE IDENTITIES FOR REFUNDS RETURNED ALONG THE PATHS TAKEN TO MAKE THE PURCHASES, which was filed on Mar. 19,1999, and is hereby incorporated by reference herein.

This application is also related to U.S. patent application Ser. No. 09/316,717, entitled METHOD AND SYSTEM FOR ENFORCING LICENSES ON AN OPEN NETWORK, which was filed on the same day as the present application, and is hereby incorporated by reference herein.

BACKGROUND

1. Field of the Invention

This invention relates generally to an electronic commerce system and more particularly to delegating permissions in the system.

2. Background of the Invention

With the advent of electronic forms of communication, including telegraph, telephone, radio, television, and more recently digital networks, it has become possible to conduct commerce electronically using digital computer systems. Many electronic fund transfer systems require a "trusted" third party between the vendor and consumer to authenticate the validity of the electronic funds. The requirement of a third party adds expense to every transaction because of the cost of extra communications and encryption. In addition, current electronic fund transfer networks, e.g., Western Union and Federal Reserve banks, typically require physically secure communications media which is immune to "eavesdropping." Such secure networks are generally not available to consumers at large.

Alternative methods of electronic fund transactions involve establishing a long-term relationship between the vendor and consumer, either through a subscription service or by billing accounts as provided by credit card organizations. These methods are efficient at handling transaction requests, assuming a reasonable authentication scheme. However, these methods require a prior effort to establish an "account" or other evidence of credit worthiness. For a large number of consumers, e.g. all potential users of a large network of computers like the Internet, setting up accounts and maintaining separate credit information with every vendor adds inconvenience and impediments to the consumers, and expense to the vendors.

In response to these needs, U.S. Pat. No. 5,802,497 (the '497 patent) describes a lightweight and secure protocol for electronic commerce over the Internet. The protocol is designed to support purchases costing less than a cent. The system is based on decentralized validation of electronic cash at a vendor's server without much additional communication, expensive encryption, or off-line processing.

Two innovations in the '497 patent are its use of brokers and scrip. Brokers take care of account management, billing, connection maintenance, and establishing accounts with vendors. Scrip is digital cash that is valid for only a specific vendor. The vendor locally validates the scrip to prevent consumer fraud, such as double spending.

Every time a consumer visits a new vendor, the consumer must get scrip for that vendor from a broker. Scrip is held and manipulated by the consumer using an application called a "wallet." The wallet includes scrip with each request to purchase content and gets back change from the vendor with the returned content. The consumer's wallet may be stored and executed locally on the consumer's computer system or it may run on a remote server.

Each piece of scrip has an associated customer secret. The consumer uses a hash including the customer secret to prove to the vendor that the consumer has the right to spend the scrip. Accordingly, the consumer's wallet must remember and protect the customer secret. The consumer has complete control of the scrip and no one else can do anything with it, as long as the consumer keeps the customer secret confidential.

However, the consumer may wish to delegate the rights to perform specific actions with the scrip to one or more agents. For example, a consumer may be willing to trust a remote server to store its scrip, but the consumer may not be willing to give the remote server the right to spend the scrip. Yet, the consumer may want the server to refresh any scrip that is about to expire. Accordingly, there is a need for a way to delegate certain rights, permissions, and privileges to designated agents for specific pieces of scrip without revealing the full customer secrets.

SUMMARY OF THE INVENTION

The above needs are met by a method and system for electronic commerce that uses a delegation scrip secret (DSS) to enable the delegation of permission to perform certain actions to agents. The system includes a broker computer system having a database of broker scrip, each broker scrip representing a form of electronic currency. The system also includes a vendor computer system having a database containing products which may be exchanged for the vendor scrip, the vendor computer system capable of providing vendor scrip. In addition, the system includes a consumer computer system with which a consumer may initiate transactions to obtain one or more of the products contained in the database of the vendor computer system. The system also includes an agent computer system to which the consumer can delegate rights to perform certain actions on the scrip.

Each piece of scrip has a value, which, when it is a monetary value, may range from a few dollars to a few hundredths of a cent. In addition, each piece of scrip has a Customer ID from which a customer secret (CS) is derived. The broker and the vendor share and maintain a master customer secrets (MCS) table indexed by the Customer ID. When a broker (or vendor) issues scrip to the consumer, the broker hashes the Customer ID with the MCS specified in the table to form the CS. A preferred embodiment of the present invention uses the HMAC-MD5 algorithm for hashing when there is a distinguished value to use as the key, and the MD5 algorithm otherwise. The CS is sent to the consumer with the associated piece of scrip. The consumer holds the scrip and its associated CS in a database called a "wallet" and uses the CS to prove that the consumer has the right to spend the associated scrip.

A delegator, such as the consumer, delegates the rights to perform actions on scrip to a delegatee, such as an agent, by passing a list of the delegated actions to the delegatee along with the scrip. For sake of efficiency, the absence of any delegation represents the root delegation (i.e., the delegation of all rights). In addition, the delegation of certain actions may implicitly delegate other actions.

The delegator also preferably derives a delegation scrip secret (DSS) from the CS for the scrip. The DSS for the root delegation is the CS. For other delegations, the DSS is calculated as a hash of the new delegation with the old delegation scrip secret (i.e., the delegation secret owned by the delegator) as the key. The DSS is preferably securely transmitted to the delegates.

When the delegator and delegatee share access to the stored delegation (for instance, when it is stored in the scrip file for the wallet), the DSS's must be encrypted by a method that both the delegator and delegatee can decrypt. Therefore, the delegator and delegatee must share a secret (called here the delegation pass phrase or DPP) for the encryption. Preferably, the delegator derives the DPP from the delegator's own pass phrase and securely provides the delegatee with the DPP. In one embodiment, the DPP is calculated as a hash of the delegator's pass phrase with the delegation and a nonce. With this embodiment, the delegator does not need to explicitly record the DPP for a delegatee. Alternatively, any agreed mechanism may be used to establish a shared DPP between the delegator and delegatee.

The delegatee may either directly remember and use the DPP provided by the delegator, or preferably may encrypt the DPP using a pass phrase of the delegatee's choice and store it for eventual use.

Alternatively, the delegator and delegates may store the scrip separately. At the minimum, for each piece of scrip, the delegator stores its encrypted DSS and the nonce used to perform the encryption in its file. In addition, the delegator stores a delegation, encrypted DSS, nonce triple for each delegation of the scrip. Similarly, the delegatee stores the delegation, an encrypted DSS, and the nonce used to encrypt the DSS for each piece of scrip held by the delegatee and for each sub-delegation of the scrip.

To perform an action with a delegated piece of scrip, the delegatee sends a message to a server, such as a broker or vendor, containing the action, the scrip, the delegation, and a request stamp (RS). The RS is preferably formed from a hash of the action, scrip, and delegation concatenated together, with the DSS as the key. The server can determine the CS for the scrip, so the server is able to recreate the DSS and, thus, recreate the RS and validate the delegatee. If the delegatee validates, the server performs the requested action.

Typically, the server will respond to the delegatee with new scrip. For each piece of returned scrip, the server returns a new delegation for each delegation in the request, and a new delegation for each ancestor delegation in the delegation path of the incoming scrip (i.e., the scrip used in the request to the server). To avoid sending the delegation scrip secrets for the new delegations in the clear, the server preferably encrypts the returned secrets using a new DSS (NDSS) function. The NDSS is calculated using the delegation, the incoming scrip, the outgoing scrip, a nonce, and the DSS of the incoming scrip. The scrip, nonce, and delegation are returned to the delegatee with the new encrypted DSS. Since the delegatee already knows the old DSS for its delegations of the scrip used in the transaction, the delegatee can decrypt the new DSS for those delegations. If the delegatee does not know the DSS for a delegation of the scrip returned by the server, the delegatee stores the encrypted DSS in the scrip file in a "deferred" format, along with information necessary to decrypt the DSS. When a party knowing the DSS for the scrip is activated, that party can then decrypt the deferred DSS.

DETAILED DESCRIPTION OF THE PREFERRED EMBODIMENTS

Figure 1:
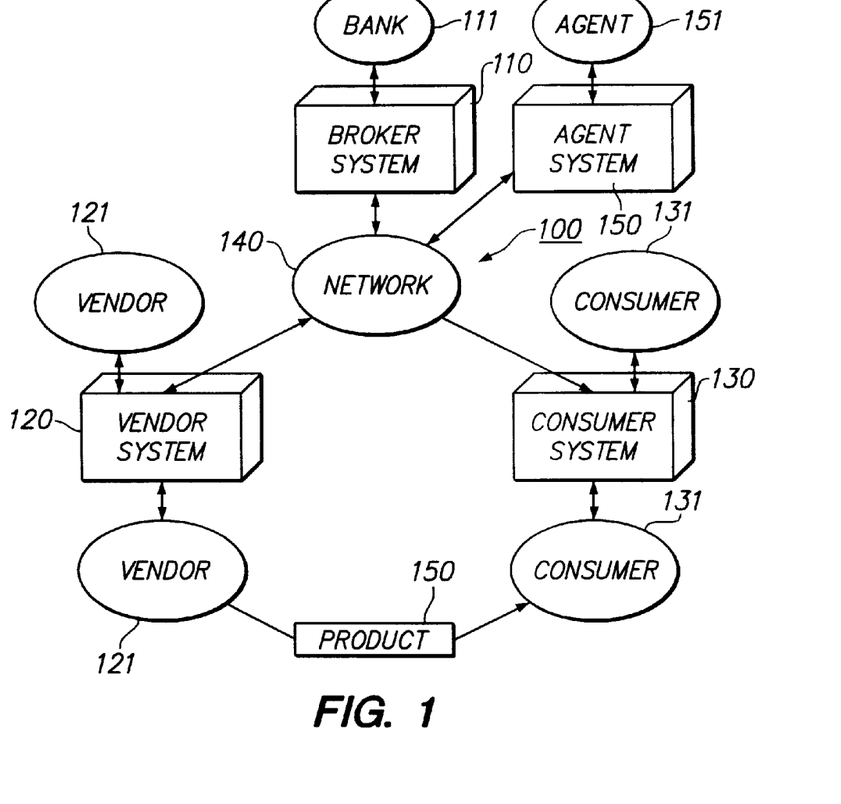
FIG. 1 is a top-level block diagram illustrating a computerized system for conducting electronic commerce.

FIG. 1 shows a computerized system 100 for conducting electronic commerce according to the principles of the invention. The system 100 includes a broker system 110, a vendor system 120, a consumer system 130, and an agent system 150 interconnected by a communications network 140.

For clarity, the system 100 depicted in FIG. 1 shows only single broker, vendor, consumer, and agent systems. In actual practice, any number of broker, vendor, consumer, and agent systems can be interconnected by the network 140.

The broker 111 using the broker system 110 can be a bank, a credit provider, an Internet service provider, a telephone company, or any institution the consumer trusts to sell scrip. The vendor system 120 is operated by a vendor 121. The vendor 121 provides products and content 150 of any type to consumers.

A consumer 131 can use the consumer computer system 130 to "electronically"acquire the products 150 of the vendor 121. The network 140 can be public or private, such as, for example, the Internet, a switched telephone system, a satellite linked network, or another form of network.

A consumer 131 can delegate certain actions related to the scrip to the agent 151 using the agent computer system 150. The agent 151 can perform the delegated actions in place of the delegating consumer 131. For example, a consumer 131 may wish to store the consumer's scrip on a remote server maintained by the agent 151. The consumer 131 may wish to give the agent 151 the right to refresh any scrip that is about to expire, but not the right to spend the scrip. Accordingly, the consumer 131 will delegate only the right to refresh the scrip to the agent 151.

Figure 2:
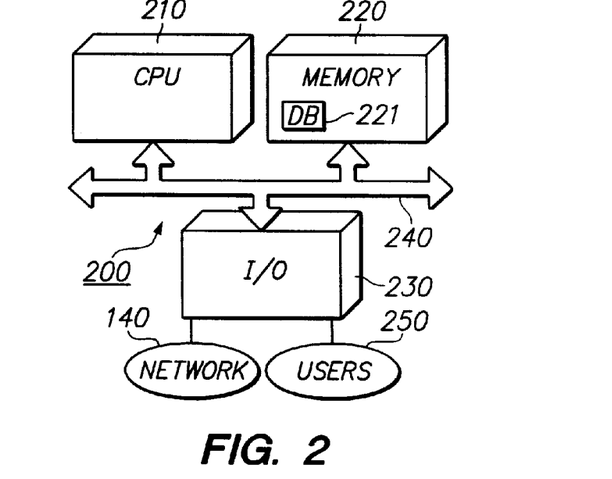
FIG. 2 is a block diagram illustrating a computer system used in the system of FIG. 1.

A computer system 200 suitable for use as the broker, vendor, consumer, and agent systems is shown in FIG. 2. The computer system 200 includes a central processing unit (CPU) 210, a memory 220, and an input/output interface 230 connected to each other by a communications bus 240. The CPU 210, at the direction of users 250, e.g. brokers, vendors, consumers, and/or agents, executes software programs for manipulating data. The programs and data can be stored in the memory 220 as a database (DB) 221. The DB 221 storing programs and data on the consumer computer system 130 is referred to as a "wallet."

The memory 220 can include volatile semiconductor memory as well as persistent storage media, such as disks. The I/O interface 230 is for communicating data with the network 140, the users 250, and other computer system peripheral equipment, such as printers, tapes, etc.

The computer system 200 is scaled in size to function as the broker, vendor, consumer, or agent system. For example, when scaled as the consumer computer system 130, the computer system 200 can be a small personal computer (PC), fixed or portable. The configurations of the computer system 200 suitable for use by the broker 111, vendor 121, and agent 151 may include multiple processors and large database equipped with "fail-safe" features. The fail-safe features ensure that the database 221 is securely maintained for long periods of time.

Figure 3:
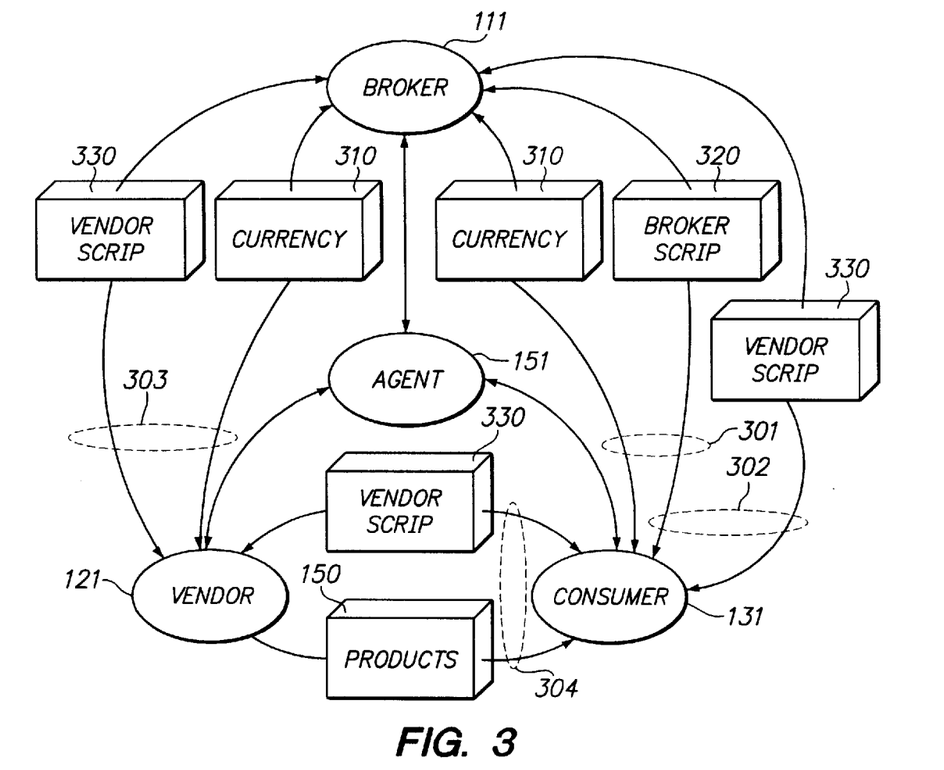
FIG. 3 is a flow diagram illustrating the operations of the system of FIG. 1.
Figure 3A:
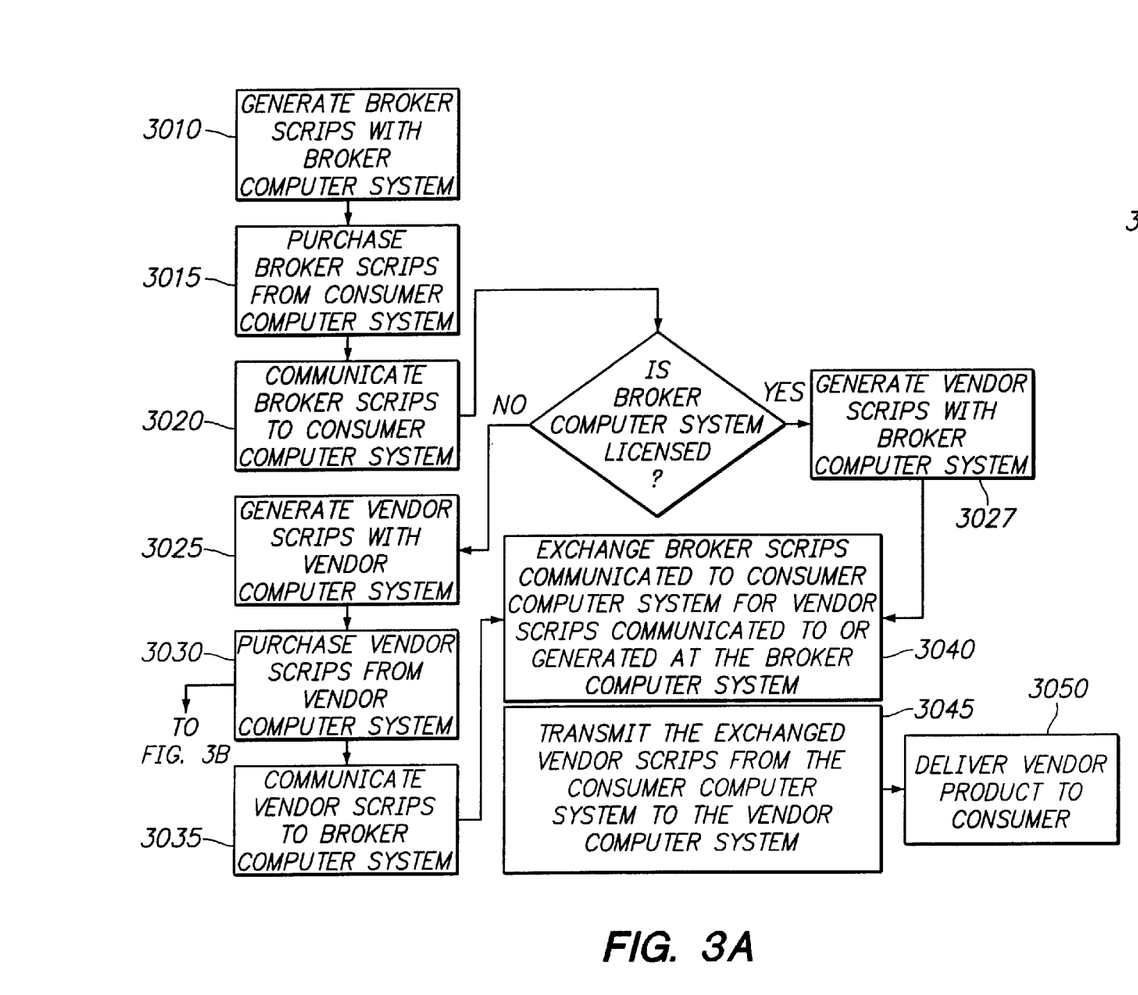
FIG. 3A is a flow chart illustrating certain operations depicted in FIG. 3.

FIG. 3 and FIG. 3A show an operation of the system 100 according to a preferred embodiment of the invention. The consumer 131 in step 3015 uses currency to purchase electronic broker scrip 326 generated in step 3010 by the broker 111. Here, purchasing means that upon a validation of the authenticity of the consumer 131 and the consumer's currency 310, the broker system 110 generates signals in the form of data records. The signals in step 3020 are communicated, via the network 140, to the consumer system 130 for storage in the wallet 221 of the memory 220 of the consumer system 130.

The currency 310 which is exchanged for scrip 320 can be cash, check, credit card, bank ATM card, debit card, phone card, or other items of value. The scrip 320 can also be freely exchanged with "coupons" frequently used in promotional schemes. The "coupons" can be in the form of scrip.

The scrip is described in further detail below. In brief, the scrip is stamped by the generator of the scrip. This means that the scrip carries information that is verifiable by only the originator. In addition, each script is uniquely identifiable. After a single use, the originator of the scrip can "invalidate it," meaning that the signals of the data record are no longer accepted for processing by the originating computer system.

Preferably, the broker system 110 in step 3027 executes licensed software programs which generate vendor scrip 330 for the consumer 131 as needed. In this case, the "value" of the license can be proportional to the amount of scrip that the licensee can generate. Alternatively, the broker 111, in a similar transaction 303, exchanges currency 310 for bulk electronic vendor scrip 330 in step 3030 and 3035. The vendor scrip 330 is generated in step 3025 by the vendor system 120. The scrip can have an expiration date so that the issuer does not forever need to maintain data regarding the issued scrip.

The consumer 131 desiring the products 150 provided by the vendor 121 can exchange 3040, 3045, 302 the broker scrip 320 for vendor scrip 330, and then exchange the vendor scrip for products 150. If the purchase price of the product 150 is less than the value of the vendor scrip 330, new vendor scrip can be issued for the balance as "change." A separate transaction type allows consumers 131 to ask vendors 121 and brokers 111 to refund scrip.

Figure 3B:
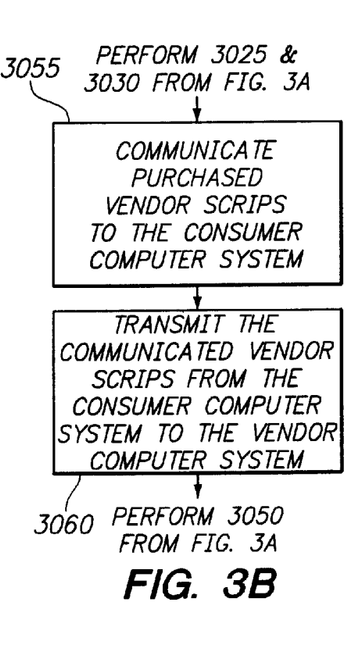
FIG. 3B is a flow chart illustrating other operations depicted in FIG. 3.

In an alternative embodiment shown in FIG. 3, FIG. 3A and FIG. 3B, the consumer 131 can establish an "account" with the vendor 121 to acquire vendor scrip 330 directly, without the need of a third party broker as indicated in steps 3055 and 3060. Establishing an account means that an account data record is maintained in the vendor computer system 120.

The consumer 131, in a transaction 304, submits the vendor scrip 330 to the vendor 121 in step 3045. The vendor 121 checks the stamp of the vendor scrip 330 to verify its authenticity, and to validate the "currency" amount. Verification also checks the local database to determine whether the scrip is previously spent. Approval of the transaction 303 results in the delivery of the desired product 150 to the consumer 131 in step 3050. In the transaction 304, change can also be returned to the consumer 131 in the form of vendor scrip having a value which is the amount of the over-payment, e.g., another data record communicated by the network 140. As described in more detail below, the consumer can delegate one or more of the actions illustrated in FIG. 3 to one or more agents 151.

Figure 4:
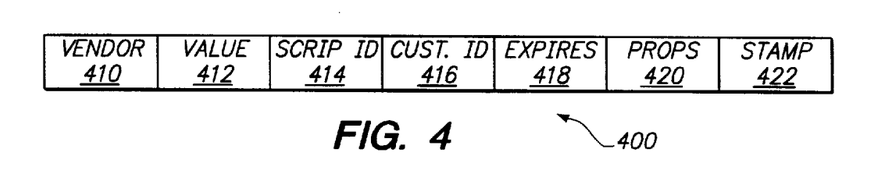
FIG. 4 is a block diagram illustrating the data fields of a piece of scrip used in the system of FIG. 1.

The electronic signals which represent the scrip, and which are processed and communicated by the system 100, are described with reference to FIG. 4. FIG. 4 is a block diagram illustrating the data fields of a single piece of scrip 400 according to one embodiment of the present invention. The scrip 400 is logically separated into seven data fields. The Vendor field 410 identifies the vendor for the scrip 400. The Value field 412 gives the value of the scrip 400. The Scrip ID field 414 is the unique identifier of the scrip. The Customer ID field 416 is used by the broker 111 and vendor 121 to determine the customer secret (CS) for the scrip. A portion of the Customer ID field 416 forms the Customer ID partition number. The Expires field 418 gives the expiration time for the scrip 400. The Props field 420 holds customer properties, such as the customer age, state of residence, etc. Finally, the Stamp field 422 holds a digital signature and is used to detect tampering with the scrip 400.

In a preferred embodiment of the present invention, the broker 111 and vendor 121 share a Master Customer Secret (MCS) table indexed by the partition number of the Customer ID field 416. Thus, the MCS table is as follows:

| MCS Table: | |
| --- | --- |
| Partition Number | Master Customer Secrets |
| $P_1$ | $MCS_1$ |
| $P_2$ | $MCS_2$ |
| $P_3$ | $MCS_3$ |

Both the partition numbers and the MCS are preferably binary strings having lengths and values agreed to by the broker 111 and the vendor 121.

When the consumer 131 buys scrip 400 from the broker 111 (or receives scrip from a vendor 121), the broker 111 generates the CS for the scrip 400 by determining the partition number from the Customer ID field 416 and looking up the corresponding MCS in the MCS table. Then, the broker 111 calculates the CS from a hash of the customer ID with the MCS as:

$$CS = H(\text{customer ID}, MCS),$$

where H( ) denotes the hash function. In one embodiment, the hash function used throughout the electronic commerce system is HMAC-MD5, described in H. Krawczyk, M. Bellare, R. Canetti, "HMAC: Keyed-Hashing for Message Authentication," RFC 2104, February 1997, and R. Rivest, "The MD5 Message Digest Algorithm," RFC 1321, April 1992, both of which are hereby incorporated by reference herein. However, any suitably secure one-way hash function can be substituted.

If this is the first piece of scrip purchased by the consumer 131 from the broker 111, the CS is provided to the consumer 131 via a secure channel and the consumer 131 stores the CS in the wallet 221. A preferred secure channel is described in U.S. patent application Ser. No. 09/081,521, entitled METHOD FOR COMMUNICATING SECURE AND AUTHENTICATED TRANSACTIONS OVER AN NON-SECURE NETWORK SUBJECT TO EXPORT RESTRICTIONS, which was filed on May 19, 1998, and is hereby incorporated by reference herein.

If the consumer 131 has already received a CS from the broker 111, the broker 111 uses the previously provided CS (the old CS, or OCS) to transmit a new CS (NCS) to the consumer 131 without requiring a secure channel. The broker 111 calculates the NCS using the Customer ID field 416 and the corresponding MCS in the MCS table in the same manner that the OCS was calculated. Then, the broker 111 calculates an encrypted NCS (ENCS) as follows:

$$ENCS = NCS \text{ XOR } H(\text{nonce}, OCS),$$

where "XOR" is the exclusive-or function and a nonce is a random, guaranteed unique string of arbitrary length. The ENCS and the notice are passed to the consumer 131.

When the consumer 131 receives the ENCS and nonce, the consumer 131 derives the NCS by performing the calculation:

$$NCS = ENCS \text{ XOR } H(\text{nonce}, OCS).$$

The consumer 131 preferably stores the NCS with the corresponding scrip 400 in the wallet 221. Thus, the broker 111 communicates the value of the NCS to the consumer 131 without actually transmitting the NCS in the clear. The consumer 131 uses the CS to prove ownership of, i.e., possession of the right to spend, the scrip.

In a preferred embodiment of the present invention, the consumer 131 requests product from the vendor 121 in the context of the World Wide Web. However, the present invention can be used for purchases in any electronic context. Accordingly, the request is preferably phrased as a uniform resource locator (URL) pointing to a location at a vendor-controlled domain.

To spend scrip 400 for a product, the consumer 131 sends the vendor 121 a message in the form:

$$\text{scrip, request, H(scrip, request, CS)},$$

where scrip is the vendor scrip 400 issued to the consumer, the request is the URL specifying the requested product, and H(scrip, request, CS) is a hash of the scrip, request, and the CS. Thus, the consumer 131 sends the scrip in the clear (unencrypted).

When the vendor 121 receives the scrip 400, the vendor 121 first validates the Stamp field 422 to ensure that the scrip 400 was not altered. Next, the vendor 121 validates that the consumer 131 possesses the correct CS. If the stamp field and CS validate, then the vendor 121 has a high degree of confidence that the scrip 400 was not altered and was received from someone knowing the CS.

Once the vendor 121 has validated the scrip 400 and consumer 131, the vendor preferably provides the requested product to the consumer 131. Also, the vendor 121 may issue scrip to the consumer 131 as change by using the techniques described above.

For normal purchases, as described above, the knowledge of secrets follows a defined trust relationship. It is acceptable for brokers 111 to know the customer secrets for vendor 121 scrip because the brokers 111 are trustworthy. Vendors 121 know the customer secrets for scrip the vendors validate or produce. Also, consumers 131 know the customer secrets for only the scrip they own.

When a consumer 131 delegates a set of actions for a piece of scrip to an agent 151, the delegating consumer may not wish to give the agent 151 all the secrets for the scrip in order to maintain ultimate control of the scrip. Accordingly, the present invention allows the consumer 131 to delegate actions without providing "stronger" scrip secrets than are necessary for the agent 151 to perform the actions.

In this description, a "delegation" is a set of delegated actions and, optionally, an expiration time for the delegation. A delegation is specific to a piece of scrip. Actions on scrip that may be delegated include: spend, refresh the expiration time, recover lost scrip, refund unused scrip, convert scrip to other currencies, subdivide scrip into multiple pieces, complain about problem purchase, and any other useful actions. The delegation allows the agent 151, or other delegatee, to perform the delegated actions in place of the delegator.

A preferred embodiment of the present invention represents the set of actions in a delegation as a string listing the names of the delegated actions. The root delegation is defined as the full set of all actions with no expiration time. However, for efficiency and convenience, the root delegation is implicitly defined by the absence of any delegation, thereby removing the need to transmit a delegation in this case. In addition, certain actions are preferably included in every delegation—such as refreshing scrip before it expires. These actions are always allowed and cannot be removed from a delegation. Once again, implicitly including certain actions with delegations removes the need to explicitly list and transmit an action which is always present.

An alternative embodiment of the present invention may use alternate syntax to express delegations. One alternative embodiment support revocations in addition to delegations. A revocation explicitly removes the right of the delegatee to perform an action. For example, a delegator can delegate the full set of actions to a delegatee along with one or more revocations of actions in the set. The delegatee would be able to perform all of the actions in the set except for the revoked actions.

Figure 5:
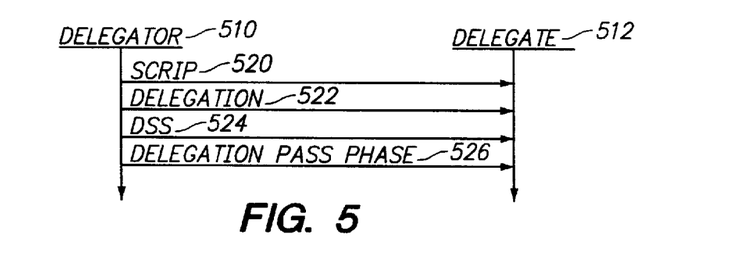
FIG. 5 is a diagram illustrating transactions between a delegator and a delegates in the electronic commerce system.

FIG. 5 is a diagram illustrating the transactions between a delegator 510 and a delegatee 512 according to a preferred embodiment of the present invention. In FIG. 5, the order of the illustrated transactions can vary depending on the implementation. Accordingly, the illustrated order should be considered as only one possible embodiment of the present invention.

The delegator 510, may be, for example, a consumer 131, and the delegatee may be an agent 151. The delegator 510 may also be an agent 151 or some other form of delegatee with respect to another delegator higher up the delegation path. To delegate a specific set of actions for a piece of scrip 400 from the delegator 510 to the delegates 512, the delegator 510 transmits 520 the scrip 400 to the delegates 512.

In addition, the delegator 510 transmits 522 the delegation for the piece of scrip to the delegatee 512. The delegation delegates a set of actions that can be performed by the delegator 510 to the delegatee 512. To delegate a specific set of actions in a delegation, the delegator 510 appends the names of the new sets of actions to the delegation owned by the delegator. So, if the set of actions owned by the delegator 510 is "X, Y, Z," and the delegator is delegating the actions "X, Z" to the delegatee 512, the delegator sends the delegation "X, Y, Z/X, Z" to the delegatee, where the "/" is the delimiter between the delegations.

The delegator 510 also transmits 524 a delegation scrip secret (DSS) to the delegatee 512. Any secure mechanism can be used to transmit the DSS. Although not shown at this point in FIG. 5, the delegator 510 and delegatee 512 preferably establish a delegation pass phrase (DPP), and use the DPP to encrypt the DSS before it is transmitted. The delegatee 512 uses the DSS to validate that it has the right to perform the delegated actions on the scrip. The calculation of the DSS is defined as a recursive function:

Let A, B, . . . , X, Y be sets of delegated actions, then:

$$DSS(A/ \ldots /X/Y)=H(A/ \ldots /X/Y, DSS(A/ \ldots /X));$$

$$DSS(A/ \ldots /X)=H(A/ \ldots /X, DSS(A/ \ldots /W));$$

. . .

$$DDS(A)=H(A, CS);$$

$$DSS()=CS,$$

where H(a, key) denotes the keyed hash function where "a" and "key" are any string or sequence of bits, and CS is the customer secret for the scrip. Thus, the DSS for the root delegation is the CS for the scrip. The DSS for a new delegation is the hash of the delegation using the DSS for the ancestor delegation as a key.

As an example; suppose there are four possible actions on a piece of scrip: A, B, C, and D. The delegation for actions A, C, and D, and its DSS, is:

("A, C, D", DSS("A, C, D")), where "A, C, D" is a string containing the names of the actions in the delegation and DSS("A, C, D") is the DSS for the delegation.

Fully expanded, the delegation and DSS for actions A, C, and D is:

("A, C, DD", H("A, C, D", CS))

The CS is used in the hash because the CS is the DSS for the previous (i.e., root) delegation. Since each piece of scrip has a different CS, the delegation is only effective for the single piece of scrip having this CS.

To further sub-delegate actions A and D, the delegation and DSS is:

(A, C, D/A, D", DSS("A, C, D/A, D")).

Fully expanded, the sub-delegation for actions A and D and the DSS is:

("A, C, D/A, D", H ("A, C, D/A, D", DSS("A, C, D")))=("A, C, D/A, D", H("A, C, D/A, D", H("A, C, D", CS))).

As described above, the sub-delegated actions are appended to the old delegated actions. The hash key is the DSS of the old delegation. The actions can be further sub-delegated. To sub-delegate the action D, the delegation and DSS is:

("A, C, D/A, D/D", H("A, C, D/A, D/D", DSS("A, C, D/A, D"))).

If the path of delegations and sub-delegations is different, then the DSS for the delegation is different. For example, other delegations of action D and the associated DSS might be:

("D", DSS("D"));

or ("B, C, D/D", DSS("B, C, D/D")).

In each of these examples, the path of ancestor delegations that led to the delegation of D is different, thereby causing the delegation and DSS to be different.

The delegator 510 and delegates 512 preferably store the scrip and any delegations of the scrip in a shared scrip file. The particulars of the scrip file are described in more detail below. The basic method for protecting stored scrip is described in U.S. patent application Ser. No. 09/273,240, entitled ENCRYPTING SECRETS IN A FILE FOR AN ELECTRONIC MICRO-COMMERCE SYSTEM, which was filed on Mar. 19, 1999, and is hereby incorporated by reference herein. In brief, application Ser. No. 09/273,240 describes a method and system for protecting scrip stored in a file with a pass phrase. The user of the scrip (e.g., the consumer) supplies a pass phrase. The customer secrets for the scrip in the file are encrypted using the formula:

$$ECS=CS \text{ XOR } H(\text{nonce, pass phrase}),$$

where ECS is the encrypted CS. The ECS and the nonce are stored with each piece of scrip in the file. When the user provides the pass phrase, the hash is computed and XORed with the ECS to get the original CS.

A preferred embodiment of the present invention encrypts the DSS for a piece of scrip and any sub-delegations of the scrip using similar techniques. Preferably, each delegatee 512 having a copy of the scrip should be able to decrypt its own delegation scrip secrets and any secrets that are derived from its delegations (i.e., from subsequent delegations made by the delegates 512). Each delegatee 512, however, should not be able to decrypt ancestor delegations or delegations that are not derived from the delegatee's delegation. The root delegator 510 is able to decrypt and encrypt every DSS.

Accordingly, the delegator 510 preferably derives the pass phrase for delegations from the delegator's own pass phrase. According to this embodiment, the new delegated pass phrase (i.e., the delegatee's pass phrase) is calculated with a formula similar to the formula used to calculate the DSS. So:

$$DPP("A, C, D/D")=H("A, C, D/D", DPP("A, C, D")),$$

where DPP is the delegated pass phrase for the parent delegation. Accordingly, the new DPP is the hash of the new delegation using the delegator's pass phrase as the key. The pass phrase for the root delegation is preferably the pass phrase provided by the user.

The DPP is preferably transmitted 526 to the delegatee 512 in a secure manner and the delegatee is responsible for remembering the pass phrase. For instance, the delegatee may store the DPP in an encrypted form and decrypt it as necessary. The delegator 510 does not have to remember the DPP because the DPP can be derived using the delegation and the delegator's own pass phrase. In an alternate embodiment, the pass phrase is chosen randomly and explicitly stored with the scrip. The delegatee 512 preferably uses the DPP to encrypt the DSS for its delegation by using the equation:

$$EDSS = DSS \text{ XOR } H(nonce, DPP),$$

where EDSS is the encrypted DSS, DSS is the DSS for the scrip, and DPP is the DPP received from the delegator 510. The EDSS is stored with the nonce and delegation in the scrip file. Since the delegates 512 knows the DPP, and can read the nonce and EDSS from the file, the delegates 512 can easily decrypt the EDSS.

Figure 6:
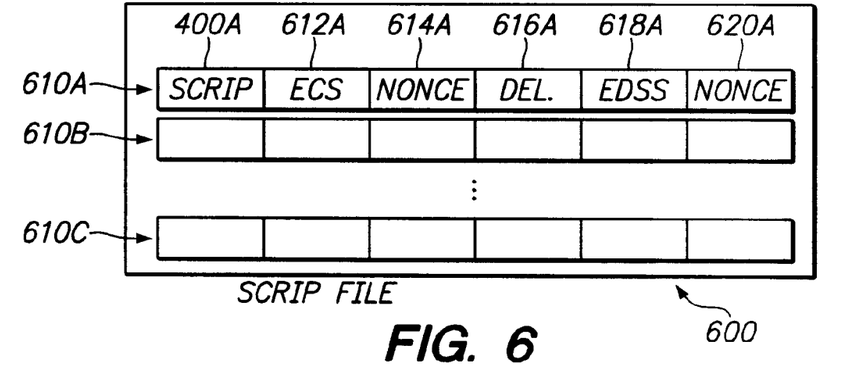
FIG. 6 is a block diagram illustrating a scrip file held in the wallet of a consumer computer system or in an agent computer system.

FIG. 6 is a block diagram illustrating a scrip file 600 that is preferably held by the wallet 221 on a consumer computer system 130 or held in an agent computer system 150. The scrip file 600 contains one or more entries 610A, 610B, 610C, and each entry, such as entry 610A, holds a piece of scrip 400A. The scrip 400 has the fields illustrated in FIG. 4. In addition, each entry 610 holds an ECS 612A for the scrip and the nonce 614A used to encrypt the CS. Since the CS is the root delegation for the scrip 400A, the ECS 612A is also the EDSS for the root delegation. In addition, the entry 610 preferably holds a (delegation 616A, EDSS 618A, nonce 620A) triple for its own delegation and for each sub-delegation of the scrip 400A.

Figure 7:
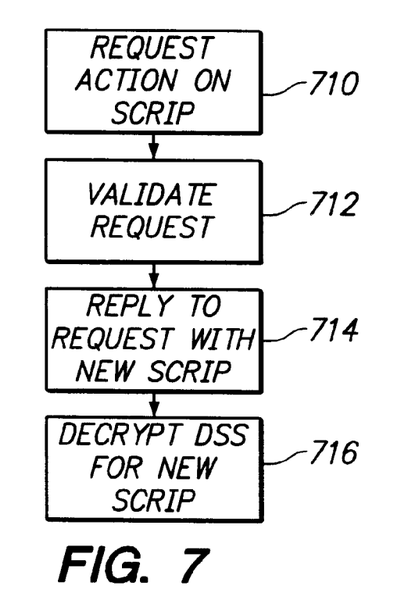
FIG. 7 is a flow chart illustrating steps for using delegated scrip in the electronic commerce system.

FIG. 7 is a flowchart illustrating steps for using delegated scrip in the electronic commerce system 100. The agent 151 or another delegatee, requests 710 that an action be performed on the scrip 400 by another party, such as a broker 111 or a vendor 121. For example, the agent 151 may request that the broker 111 refresh scrip 400 that is about to expire. For convenience, the party receiving the request is referred to as a "server."

Assume that the agent 151 has received a sub-delegation for an action D on a piece of scrip, scrip1. Further assume that the total delegation path is "A, C, D/D". To request the action D on the scrip, scrip1, the agent 151 sends a message to the server including the action, the scrip, the delegation authorizing the action, and a request stamp (RS). Thus, the message in this example is:

$$D, \text{scrip1}, \text{``A, C, D/D''}, RS.$$

The RS is preferably calculated as a hash of the action, scrip, and delegation concatenated together, with the DSS as a key. The RS in this example is:

$$RS = H(D, \text{scrip1}, \text{``A, C, D/D''}, DSS(\text{``A, C, D/D''})).$$

When multiple pieces of scrip are used in a single action, the key for the RS hash is preferably the hash of all of the delegated scrip secrets.

The server receiving the request (e.g., a broker 111 or vendor 121) validates 712 the request by recalculating the RS. The server knows the CS for the scrip because the server either initially issued the scrip or shares data with the party that did. Accordingly, the server can calculate the DSS from the CS. In this example, the DSS is calculated as follows:

$$DSS(\text{``A, C, D''}) = H(\text{``A, C, D''}, CS);$$

$$DSS(\text{``A, C, D/D''}) = H(\text{``A, C, D/D''}, DSS(\text{``A, C, D''})).$$

Once the server has the DSS for the scrip, the server recalculates the RS:

$$RS = H(\text{``A, C, C/D''}, \text{scrip1}, \text{``A, C, D/D''}, DSS(\text{``A, C, D/D''})).$$

If the RS calculated by the server matches the RS provided by the agent 151, then the server knows that the agent knows the DSS and that action D has been delegated to the agent 151. Therefore, the server validates 712 the request.

For almost all actions, the server replies 714 to the request with new scrip. The new scrip may be, for example, refreshed scrip having a later expiration date. When a server replies 714 to the request, the reply includes the delegation of the scrip, all ancestor delegations of the scrip, and a new DSS for each delegation. In other words, if the delegation for the request is "A, C, D/D", the reply includes the scrip and the specific DSS for each of the three delegations: "A, C, D/D"; "A, C, D"; and "" (the root delegation).

The DSS for each of these delegations is returned securely as an EDSS using a New Delegated Scrip Secret (NDSS) function. The definition of NDSS includes dependencies on the specific pieces of incoming and outgoing scrip because there may be multiple pieces of scrip returned in one transaction and each has its own DSS. An EDSS is calculated as follows:

$$EDSS = NDSS(\text{delegation, incoming\_scrip, outgoing\_scrip,}$$
$$\text{nonce}) = H(\text{nonce, DSS(delegation, incoming\_scrip)}) \text{ XOR}$$
$$DSS(\text{delegation, outgoing\_scrip}),$$

where incoming_scrip is the piece or pieces of scrip received from the agent 151, outgoing_scrip is a specific piece of scrip being returned by the server. and XOR is the exclusive-or operator. When multiple pieces of incoming scrip are used, the key for the NDSS hash is not the DSS from a single piece of scrip, but instead is the MD5 hash of the delegated scrip secrets from all of the pieces of scrip.

For the example of FIG. 7, suppose that S1 is the incoming scrlp and S2 is the ougoing_scrip. Three delegations are returned giving the delegation string, the nonce used in the NDSS calculation, and the encoded delegation secret:

$$EDSS\_1 (\text{``''}, \text{nonce1}, NDSS(\text{``''}, S1, S2, \text{nonce1}));$$

$$EDSS\_2 (\text{``A, C, D''}, \text{nonce2}, NDSS (\text{``A, C, D''}, S1, S2, \text{nonce2}));$$

and $$EDSS\_3 = (\text{``A, C, D/D''}, \text{nonce3}, NDSS (\text{``A, C, D/D''}, S1, S2, \text{nonce3})),$$

where EDSS_n are the returned encrypted delegations and nonce1, nonce2, and nonce3 are the nonces for the each delegation. Calculating the NDSS is relatively efficient. The first new delegation requires only three hashes and is calculated as:

$$NDSS(\text{``''}, S1, S2, \text{nonce1}) = H(\text{nonce1}, DSS(\text{``''}, S1)) \text{ XOR } DSS(\text{``''}, S2) = H(\text{nonce 1}, H(\text{``''}, CS1)) \text{ XOR } H(\text{``''}, CS2),$$

where CS1 is the CS for scrip1 and CS2 is the CS for scrip2.

Once the root DSS functions for S1 and S2 are calculated, the second new delegation requires only three additional hashes:

$$NDSS(\text{``A, C, D''}, S1, S2, \text{nonce2}) = H(\text{nonce2}, DSS(\text{``A, C, D''}, S1)) \text{ XOR } DSS(\text{``A, C, D''}, S2) = H(\text{nonce2}, H(\text{``A, C, D''}, DSS(\text{``''}, S1))) \text{ XOR } H(\text{``''}, DSS(\text{``A, C, D''}, S2)).$$

Similarly, the final NDSS calculation also requires only three additional hashes.

When the reply is received by the agent 151, the agent decodes 716 the EDSS to obtain the DSS for the new scrip. The agent 151 knows the scrip it used in the request, S1, and the delegation scrip secrets for its delegation and any of its sub-delegations. The reply returns the nonce, so the agent 151 can calculate:

H(nonce, DSS(delegation, S1)).

The agent 151 XORs this value with the EDSS value for its delegations. Since the two hash values cancel (because the values are equal and have been XOR'ed), the result of the XOR is the new DSS for the scrip. When the EDSS 618 is stored in the scrip file 600, the EDSS is said to be in "immediate" format—meaning it can be decrypted immediately by the agent 151.

However, the agent 151 making the request is not able to decode the new delegation scrip secrets for the delegations of its ancestors on the delegation path because the agent does not know the original delegation scrip secrets for those delegations. For each of those delegations, the agent 151 stores the nonce, the EDSS, and the originating scrip in the scrip file 600 in place of the EDSS 618 value. An EDSS 618 represented in this manner is said to be in "deferred" format, since the decryption of the value is deferred to later. For efficiency, the originating scrip needs to be stored only once for multiple deferred EDSS values.

When an ancestor of the delegatees 12 becomes active, it can then derive the deferred delegated scrip secrets. To do this deriving, the ancestor first decrypts the DSS for the old scrip, then it uses the old scrip's DSS to decode the new DSS. The ancestor can optionally decode only its own delegated scrip secrets or decode all of the deferred secrets for itself and any delegations derived from itself. If multiple pieces of scrip ate returned, the deferred secrets do not necessarily depend on a single piece of scrip but instead depend on all of the pieces of scrip that went into the action. Accordingly, the preferred deferred secret format gives all the scrip that it depends on and the scrip file preferably includes all of the scrip until the deferred secrets are decoded.

If the delegatee 512 performs a series of actions between activations of its ancestor, then it preferably stores all of the scrip involved in the transactions in the scrip file 600. When an ancestor delegator (typically the consumer 131) is eventually activated, it preferably resolves all of the deferred DSS in the chain of derived scrip. Once all of the derived scrip is consumed, the originating scrip is preferably deleted.

In an alternative embodiment of the present invention, the scrip represents an "authentication" value in a light-weight security system, rather than a monetary value in a commerce system. In this embodiment, the consumer 131 purchases authentication scrip by presenting authentication credentials to a broker 111. The broker 111 verifies the credentials and, if appropriate, issues the authentication scrip to the consumer 131.

Once the consumer 131 has the authentication scrip, the consumer can use it to access restricted content held by a vendor 121 in the same way a consumer uses monetary scrip to purchase content. The price of accessing restricted content is possession of scrip allowing access. The consumer 131 can delegate the authentication scrip to a delegatee using the delegation tools described above. Different delegations of the scrip can allow access to different levels of restricted content.

For example, assume content can have one of three increasing levels of security. Moreover, assume that content can only be accessed by a consumer 131 having a security clearance at least as high as the content. A consumer 131 having authentication scrip proving the highest security clearance (i.e., the root delegation) can access all of the content. By using the delegation tools described above, the consumer 131 can delegate lower levels of clearance to delegatees, thereby allowing the delegatees to access only certain content.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

We claim:

1. An electronic system, comprising:
   a delegator having rights to perform actions with scrip, and having a first delegation secret proving the rights held by the delegator, for delegating one or more rights to perform actions with the scrip; and
   a delegatee for receiving the delegation of the one or more rights to perform actions with the scrip from the delegator, the delegatee receiving a second delegation secret derived from the first delegation secret, a delegation path from the delegator to the delegatee, a customer secret for the scrip, and the one or more rights delegated from the delegator to the delegatee, the second delegation secret proving the rights held by the delegatee.

2. The electronic system of claim 1, wherein the first delegation secret is derived from the customer secret for the scrip and the rights to perform actions with the scrip held by the delegator.

3. The electronic system of claim 1, wherein the delegator generates, and the delegatee receives, a delegation pass phrase for encrypting the second delegation secret.

4. A method of using delegated scrip, comprising the steps of:
   receiving scrip, a set of delegated actions for the scrip, and an encrypted delegation scrip secret reflecting the set of delegated actions for the scrip;
   receiving a nonce;
   decrypting the encrypted delegation scrip secret with the nonce and a previously received delegation scrip secret;
   performing one of the actions in the set of delegated actions on the scrip; and
   proving the right to perform the action with the decrypted delegation scrip secret.

5. The method of claim 4, wherein the step of performing one of the actions in the set of delegated actions on the scrip comprises the step of:
   sending a message comprising:
      the action to be performed on the scrip;
      the scrip; and
      the set of delegated actions for the scrip.

6. The method of claim 5, wherein the step of proving the right to perform the action with the decrypted delegation scrip secret comprises the steps of:
   calculating a request stamp for the message with the decrypted delegation scrip secret; and
   sending the request stamp.

7. The method of claim 6, wherein the step of calculating a request stamp for the message comprises the step of:
   calculating the request stamp from the action to be performed on the scrip, the scrip, the set of delegated actions for the scrip, and the decrypted delegation scrip secret.

8. The method of claim 4, wherein computer instructions for performing the method steps are stored on a computer-readable medium.

9. A method of delegating scrip, comprising the steps of:
   providing the scrip to a delegates;
   providing a delegation to the delegatee, the delegation granting the delegates the right to perform a set of actions with the scrip; and providing a delegation scrip secret for the delegation to the delegatee, the delegation scrip secret enabling the delegatee to validate that the delegates has the delegation, the delegation scrip secret derived from a delegation path from a delegator to the delegates, a customer secret for the scrip, and the set of actions granted to the delegatee.

10. The method of claim 9, wherein the step of providing the delegation to the delegatee comprises the steps of:

appending a list of the set of actions granted to the delegatee with a delegation held by the delegator to form a new delegation; and providing the new delegation to the delegatee.

11. The method of claim 9, further comprising the steps of:

determining a delegation pass phrase; and securely providing the delegation pass phrase to the delegatee.

12. The method of claim 9, wherein computer instructions for performing the method steps are stored on a computer-readable medium.

13. A method of validating a request to perform an action with scrip, comprising the steps of:

receiving the request to perform the action with the scrip, the request accompanied by a delegation and a first request stamp;

determining a customer secret for the scrip;

calculating a second request stamp from the customer secret, the delegation, and the scrip;

determining whether the first request stamp matches the second request stamp;

performing the requested action responsive to a positive determination that the first request stamp matches the second request stamp;

providing new scrip responsive to the performance of the requested action;

calculating at least one new delegation secret for the new scrip;

securely transmitting the at least one new delegation secret;

encrypting the at least one new delegation secret with the delegation, the scrip, a nonce, and the new scrip; and transmitting the delegation, the nonce, and the encrypted new delegation secret.

14. The method of claim 13, wherein the calculating step comprises the steps of:

hashing the customer secret with the delegation to form a delegation secret; and hashing the delegation secret with the action, the scrip, and the delegation to form the second request stamp.

15. The method of claim 13, wherein the delegation comprises a plurality of separate delegations and wherein the steps of providing new scrip and calculating at least one new delegation secret are performed for each of the plurality of separate delegations.

16. The method of claim 13 wherein computer instructions for performing the method steps are stored on a computer-readable medium.

17. A memory for storing data for access by an application program being executed on a data processing system, comprising:

a data structure stored in the memory, the data structure holding information for use in an electronic commerce system, the information comprising:

a scrip representing a unit of exchange in the electronic commerce system;

a delegation for specifying an action that the application program can perform with the scrip; and an encrypted delegation scrip secret, the delegation scrip secret for validating the action specified by the delegation and derived from a delegation path from a delegator to a delegatee, a customer secret for the scrip, and the delegation.

18. The memory of claim 17, wherein the information further comprises:

a first nonce for decrypting the delegation scrip secret.

19. The memory of claim 17, wherein the information further comprises:

the customer secret for the scrip, wherein the customer secret is encrypted and wherein the decrypted customer secret represents a root delegation for the scrip; and a second nonce for decrypting the customer secret.

* * * * *